United States Patent [19]
Alinari

[11] Patent Number: 5,183,423
[45] Date of Patent: Feb. 2, 1993

[54] PROPULSION SYSTEM FOR SPEEDBOATS

[76] Inventor: Carlo Alinari, Via Monte Penna 6, 55043 Lido Di Camaiore, Italy

[21] Appl. No.: 773,274

[22] Filed: Oct. 9, 1991

[30] Foreign Application Priority Data

Oct. 10, 1990 [IT] Italy .................. 17711 A/90

[51] Int. Cl.$^5$ .............................................. B63H 5/06
[52] U.S. Cl. ........................................ 440/53; 440/79
[58] Field of Search ................ 440/90, 100, 53, 79; 114/271, 280, 281, 270

[56] References Cited

U.S. PATENT DOCUMENTS

| 1,738,410 | 12/1929 | Weir | 440/90 |
| 3,125,981 | 3/1964 | Reynolds | 114/281 |
| 3,237,582 | 3/1966 | Sturgeon et al. | 114/271 |
| 3,996,872 | 12/1976 | Pinchot | 440/90 |

FOREIGN PATENT DOCUMENTS

| 2349262 | 4/1975 | Fed. Rep. of Germany . |
| 472937 | 12/1914 | France . |
| 09381 | 1/1911 | United Kingdom . |
| 1093859 | 12/1967 | United Kingdom . |

Primary Examiner—Jesûs D. Sotelo
Attorney, Agent, or Firm—Sughrue, Mion, Zinn, Macpeak & Seas

[57] ABSTRACT

The propulsion system includes a series of large inclined propellers which operate like the wheels of a vehicle and have the functions of lifting, propelling and steering the boat on the water.

7 Claims, 3 Drawing Sheets

PROPULSION SYSTEM FOR SPEEDBOATS

BACKGROUND OF THE INVENTION

It is known that in order to achieve high speeds in boats, it is necessary to lift the hull out of the water so as to reduce friction and wave-impact. This is achieved by entrusting the two functions of propulsion and lift to separate systems; propulsion is achieved by underwater screw propellers or airscrews and lift is achieved by inclined bottoms, submerged fins, or air pressure under the hull (an air cushion). The boats are generally steered by rudders.

SUMMARY OF THE INVENTION

The object of the present invention is to provide a propulsion system for speedboats which combines the three aforesaid functions, that is, the propulsion, lift and steering of the boat, thus achieving greater energy efficiency.

The propulsion system includes a series of large screw propellers under the hull of the boat. The planes of rotation of the propellers are substantially parallel to the direction of travel of the boat and are inclined to the horizontal surface of the water at an angle "alpha" which is between 90°, like the wheels of a land vehicle, and 0°, that is, with their planes of rotation parallel to the surface of the water. For example, an angle of 30° is suitable for travelling on rough water. All the propellers rotate in the same sense like the wheels of a land vehicle and they are designed so as to provide an upthrust. When the hull is floating but stationary, the propellers are fully immersed. When the propellers are set in motion, the hull tends to be lifted progressively and, since the propellers are inclined, their upper portions tend to come out of the water. Under these conditions, the propellers produce a forward thrust and simultaneously keep the boat raised. In order to balance the lateral forces which are produced because the propellers operate with inclined axes of rotation, for each propeller situated, for example, on the left-hand side of the boat, there must be a similar, opposed propeller having the same inclination on the right-hand side; these pairs of propellers, which behave like the axles of a land vehicle, constitute the lift and propulsion units of the boat. Each boat may have any number of such units. Moreover, it is clear that, if the orientations of the planes of rotation of one or more pairs of propellers are varied, the direction of travel of the boat can be changed at will; each pair of screw propellers thus forms a lift, propulsion and steering unit of the boat. A boat driven by this propulsion system is very similar to a land vehicle in which all the wheels are driving wheels and, with suitable adaptations, can thus be used as an amphibious vehicle. The number and sizes of the blades which make up a propeller are selected on the basis of the characteristics of the boat. For example, a small number of large blades is suitable for hulls which move only on water; a large number of short blades is suitable for movement on a beach, particularly if they are foldable. It is important, in order to achieve maximum energy efficiency, that each propeller is free to follow the profiles of the waves; this is achieved by its connection to the hull by a damped resilient suspension like those used on motor vehicles. Further characteristics and advantages of the present invention will become clear from the description which follows with reference to the appended drawings, which show the schematically, by way of non-limiting example.

DETAILED DESCRIPTION OF THE INVENTION

Figure 1:
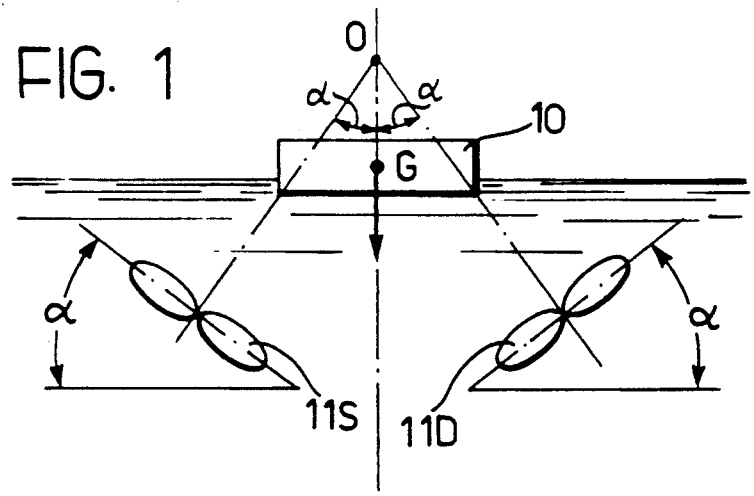
FIG. 1 is a schematic cross-section of a hull according to the present invention, taken in correspondence with a propulsion unit, at the floating, stationary stage.
Figure 2:
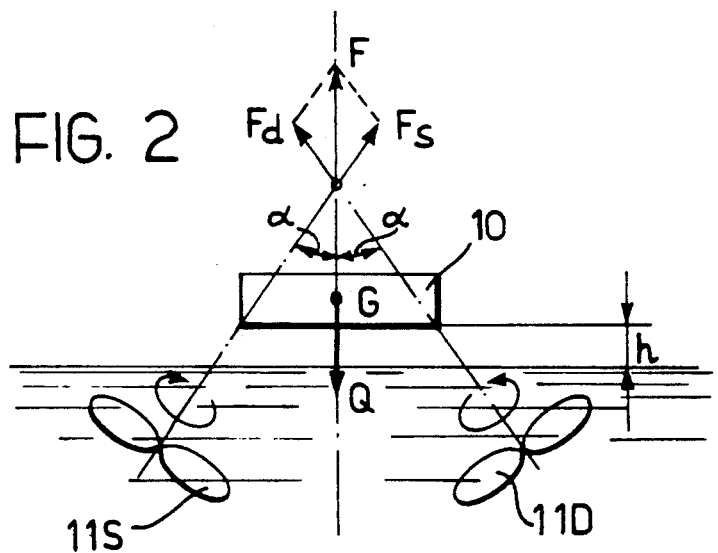
FIG. 2 shows the same hull at the beginning of the lifting stage.
Figure 3:
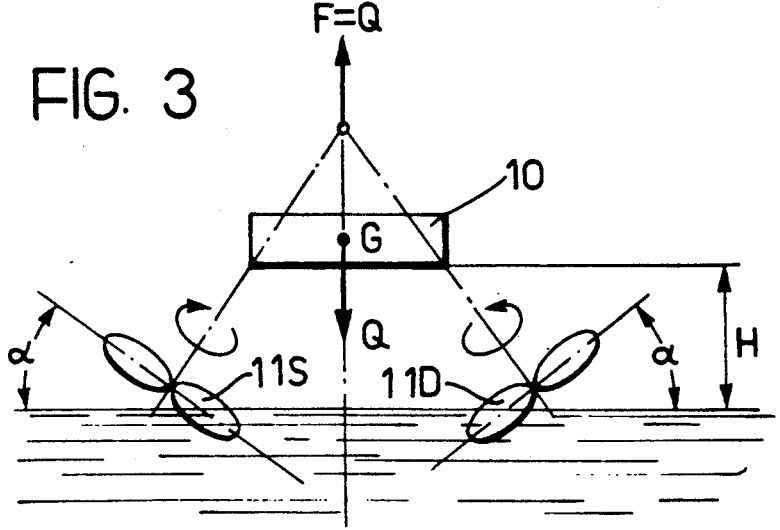
FIG. 3 shows the same hull at the forward movement stage and at maximum height.
Figure 4:
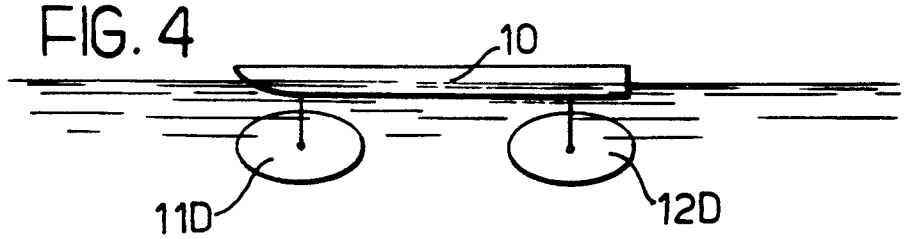
FIG. 4 shows, by way of example, a schematic, vertical, longitudinal section of a hull according to the present invention having two propulsion units with screw propellers shown diagrammatically as discs, at the floating stage.

With reference to FIG. 1, a cross-section of a hull according to the present invention in correspondence with a propulsion unit is schematically indicated 10. This drawing, shows the hull below which are a left-hand screw propeller 11 S and a right-hand screw propeller 11 D, specularly opposed to the left-hand propeller 11 S. Both propellers are inclined at the same angle "alpha" to the horizontal surface of the water and their axes of rotation converge, theoretically, at a point O above the centre of gravity G of the boat. In FIG. 1 the propellers are stationary and the boat thus remains in the floating position. FIG. 2 shows the boat of FIG. 1 with its propellers rotating in the sense indicated by the circular arrows. Since the propeller 11S has a left-hand pitch, it will produce a thrust $F_s$ and the propeller 11 D, which has a right-hand pitch, will produce a thrust $F_d$; the composition of these two forces will produce a resultant force F opposing the weight Q of the boat and acting through its centre of gravity G and, since the point 0 at which the force F is applied is above the centre of gravity G, the boat will be lifted steadily up to a height h without the risk of capsize. If the power supplied to the propellers is sufficient, the distance h will tend to assume a value H which is the maximum achievable and, at the same time, the upper portions of the propellers will tend to come out of the water and thrust the boat forwards (in the case of FIG. 3, into the page). The boat must have a certain number of propulsion units in order to ensure its longitudinal stability. The boat shown in vertical, longitudinal section in FIG. 4 has the minimum number of propulsion units, that is, two. Only the front right-hand propeller 11 D and the rear right-hand propeller 12 D can be seen in this section. In FIG. 4, the boat is shown floating and stationary.

Figure 5:
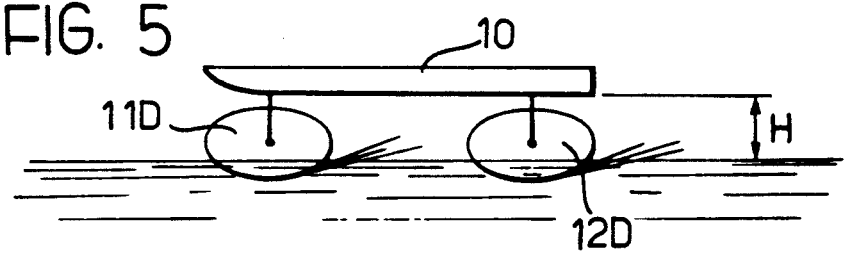
FIG. 5 shows the hull of FIG. 4 at the forward movement stage.
Figure 6:
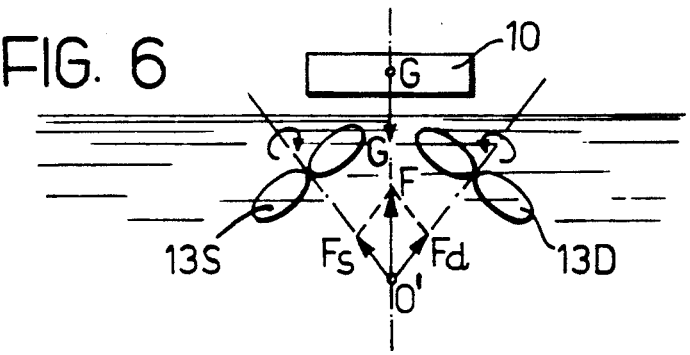
FIG. 6 is a schematic cross-section, taken in correspondence with a propulsion unit, showing a variant of the hull according to the invention which is downwardly instead of upwardly.

FIG. 5 shows the boat moving on the water at its maximum height H. It is important that the height H is proportional to the maximum height of the waves to be travelled over; the propulsion system of the present invention enables the boat to travel at a considerable height above the surface of the water so that it can pass over quite large waves very easily. FIG. 6 shows a cross-section of a variant of the propulsion unit, also according to the invention, which differs from that of FIG. 1 in that it is driven by two propellers 13 S and 13 D whose axes of rotation converge at a point O' which is below the centre of gravity G. In this embodiment the hull is not lifted in stable conditions; this variant may be useful, however, in boats with many propulsion units.

Figure 7:
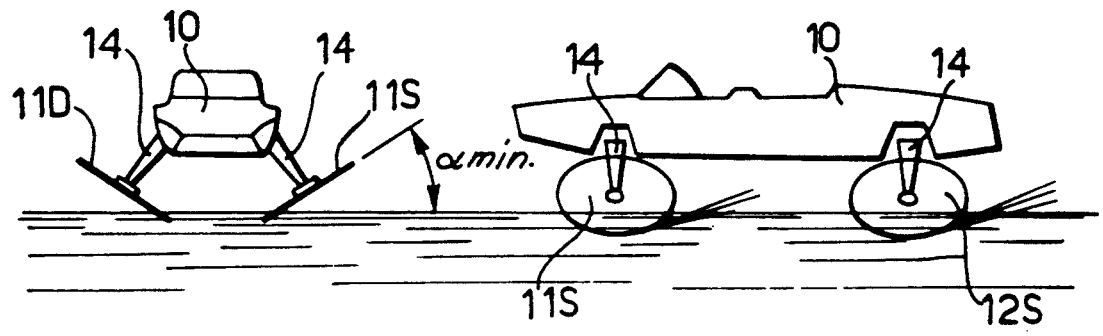
FIG. 7 shows a schematic front view and a schematic side view of an amphibious vehicle travelling on the surface of the water with the screw propellers shown diagrammatically as discs.

The propulsion system of the present invention may have many practical applications from small speedboats to those of a considerable size. One particular application is for amphibious craft of which an example is shown specifically in FIGS. 7 and 8. FIG. 7 shows a front view and a side view of an amphibious craft travelling on the water, its hull 10 being supported by a pair of front propellers 11 S and 11 D and a pair of rear propellers 12 S and 12 D (the latter pair is not visible in the drawing) connected to the hull 10 by resiliently pivoting arms 14. The pivoting of the arms 14 is damped by shock-absorbers of known type. In order to bring the boat up to a beach or a bank and to reduce its draught and width, the arms 14 may usefully enable the angle "alpha" to be varied from a minimum value "alpha min" for travel on the water, as shown in FIG. 7, to a maximum value "alpha max" for movement on the beach, as shown in FIG. 8.

Figure 8:
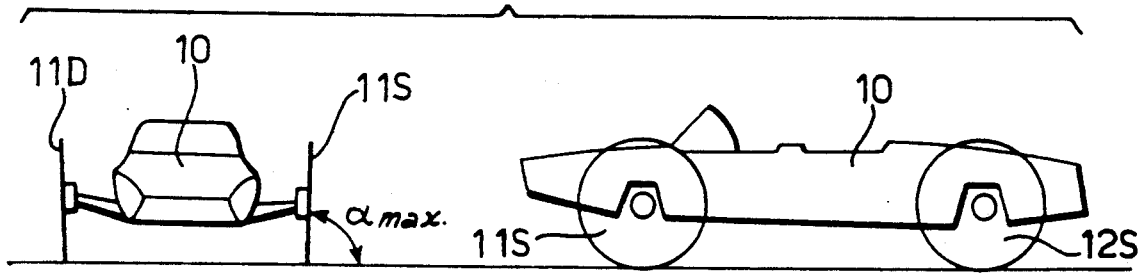
FIG. 8 shows a schematic front view and a schematic side view of the amphibious vehicle of FIG. 7 moving on a beach.
Figure 9:
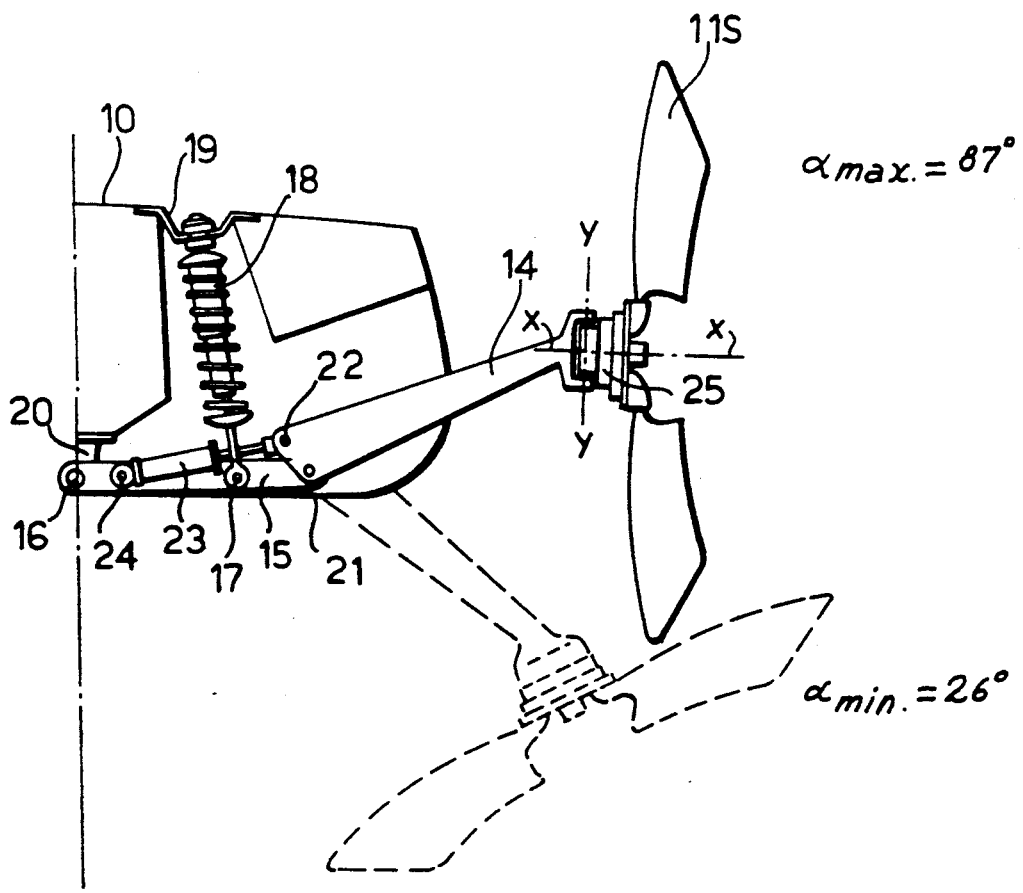
FIG. 9 shows an example of a resilient suspension which can be fitted to the amphibious vehicle shown in FIGS. 7 and 8.

FIG. 9 shows in greater detail an embodiment of the arms 14 for the boat shown in FIGS. 7 and 8. An arm is pivotable about a pin 16 inserted through a bracket 20 fixed to the hull 10. The pivoting of the arm 15 is controlled by a helical-spring/shock-absorber system 18 which is connected to the hull 10 by a bracket 19 and to the arm 15 by means of a pin 17. The inclination of the arm 14 can be varied since it is connected to the arm 15 by a pin 21. A hydraulic jack 23, one end of which acts on a pin 24 connected to the arm 15 and the other end of which acts on a pin 22 connected to the arm 14, enables the angle "alpha" to be varied from 26° to 87°. The propeller, for example 11 S, rotates about an axis X—X and is driven, for example, by a hydrostatic motor 25 which in turn is fixed to the arm 14 by a pin Y—Y; a hydraulic steering system, not shown in the drawing, can thus vary the plane of rotation of the propeller 11 S and at the same time that of 11 D, which is not shown in the drawing, enabling the direction of travel of the boat to be controlled whatever the angle "alpha" selected.

I claim:

1. A propulsion system for speedboats, comprising a series of large screw propellers each having a plurality of blades under the hull, the planes of rotation of the propellers being substantially parallel to the direction of travel of the boat and inclined to the horizontal surface of the water at an angle of between 0° and 90°, wherein the propellers are connected to the hull by means of damped resilient suspensions.

2. A propulsion system for speedboats as claimed in claim 1, wherein the right-hand and left-hand sides of the hull have equal numbers of propellers.

3. A propulsion system for speedboats as claimed in claim 2, wherein the propellers on the right-hand side of the hull form pairs with opposed propellers on the left-hand side.

4. A propulsion system for speedboats as claimed in claim 3, wherein the axes of rotation of the propellers of each pair converge at a point above the centre of gravity of the boat.

5. A propulsion system for speedboats as claimed in claim 3, wherein the axes of rotation of the propellers of some pairs converge at a point below the centre of gravity of the boat.

6. A propulsion system for speedboats as claimed in claim 3, wherein the orientations of the planes of rotation of said pairs of propellers may be varied to enable the direction of travel of the boat to be controlled.

7. A propulsion system for speedboats as claimed in claim 1, wherein the propellers are connected to the hull so that the angle at which their planes of rotation are inclined to the horizontal plane can vary from a minimum value for travel on water to a maximum value for approaching banks and for travel on dry land.

* * * * *